July 25, 1967     J. W. ROSENKRANDS     3,332,702
ROLL RESISTANT WHEEL SUSPENSION
Filed July 26, 1965
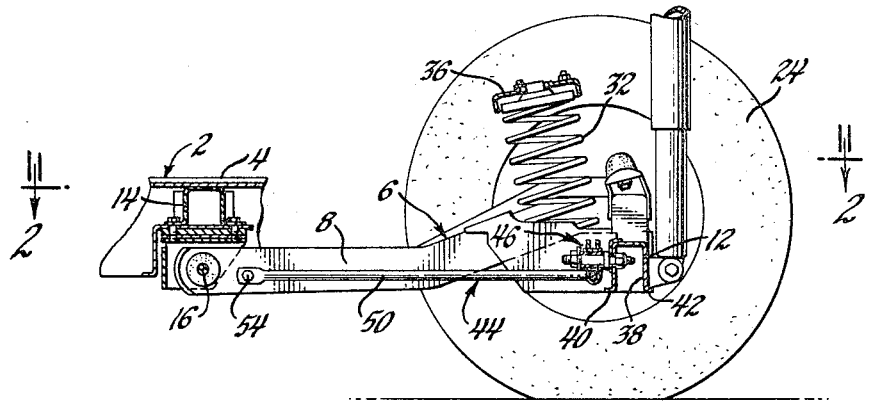
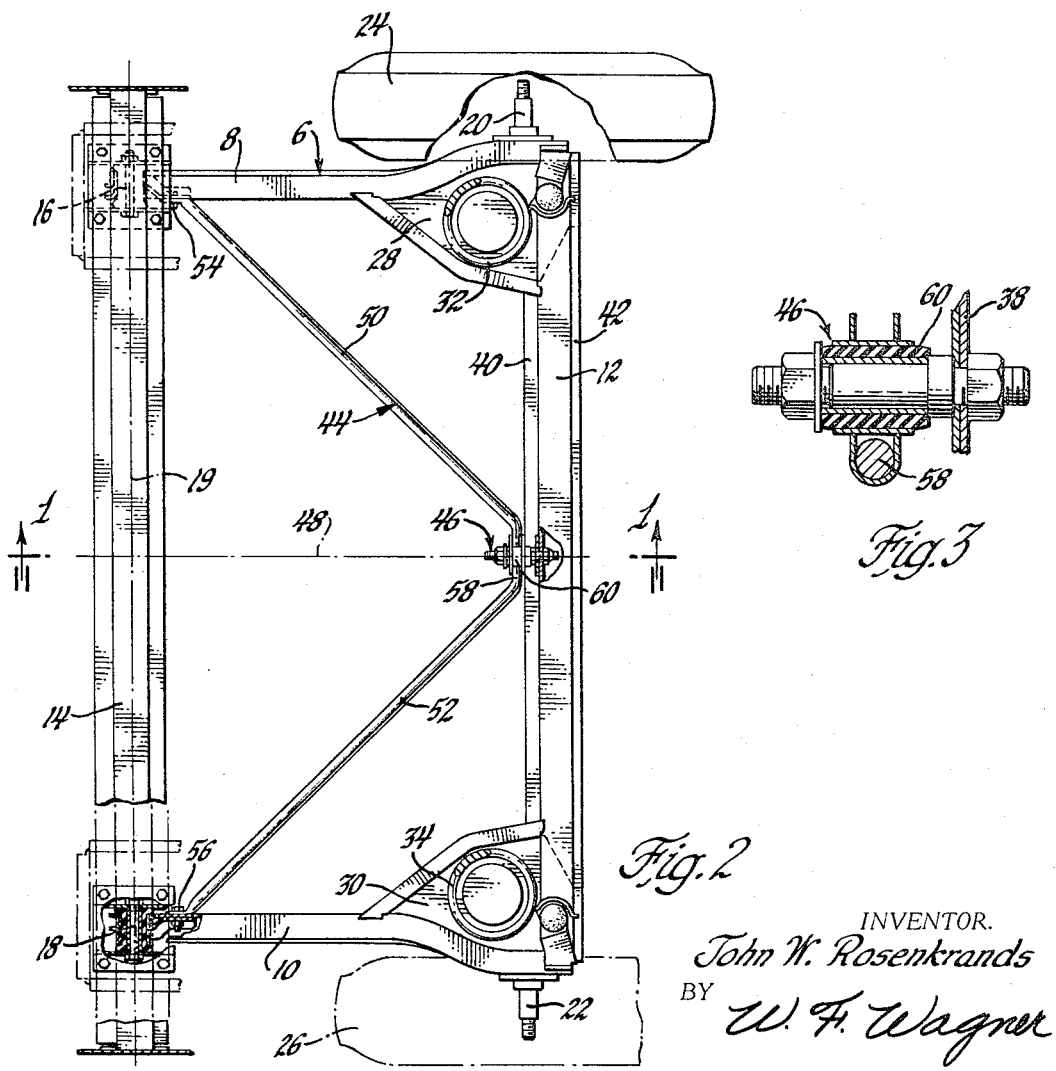
INVENTOR.
John W. Rosenkrands
BY W. F. Wagner
ATTORNEY 3,332,702
ROLL RESISTANT WHEEL SUSPENSION
John W. Rosenkrands, Detroit, Mich., assignor to General Motors Corporation, Detroit, Mich., a corporation of Delaware
Filed July 26, 1965, Ser. No. 474,718
8 Claims. (Cl. 280—124)

This invention relates to vehicle suspension and more particularly, although not exclusively, to suspension for the rear wheels of a front drive vehicle.

An object of the invention is to provide an improved vehicle suspension.

A further object is to provide a unitary structure for swingably mounting a pair of laterally opposite road wheels, on a vehicle, which structure is formed and arranged so as to impart resilient resistance to the vehicle roll motion.

Another object is to provide a structure of the stated character wherein a pair of laterally spaced road wheels are connected to a vehicle sprung mass for vertical deflection about a transverse axis by means of a unitary integral member of generally U-shaped plan form, with the branch portions thereof extending in the direction of travel of the vehicle and being pivotally connected thereto at their forward ends, the base portion being generally collinear with the axis of rotation of the wheels and exhibiting torsional deflection responsive to opposite vertical deflection of the branch portions.

A still further object is to provide a suspension of the general type described including means associated therewith for maintaining the structure against lateral displacement relative to the vehicle longitudinal centerline.

These and other objects, advantages and features of the invention will become more readily apparent as reference is had to the accompanying specification and drawing wherein:

FIGURE 1 is a fragmentary side view of the rear portion of a vehicle incorporating suspension structure in accordance with the invention;

FIGURE 2 is a fragmentary top plan view of the structure shown in FIGURE 1; and

FIGURE 3 is an enlarged sectional view of a detail of the invention.

Referring now to the drawing and particularly FIGURES 1 and 2, there is shown a suspension structure for the rear wheels of a vehicle 2 in which the reference numeral 4 generally designates the sprung mass or superstructure. It will be understood that in the illustrated embodiment driving and steering functions are both performed by the front wheels of the vehicle, not shown. Disposed beneath superstructure 4 is a unitary generally U-shaped member 6 having generally parallel laterally spaced longitudinal trailing arm portions 8 and 10 and an integral transversely extending axle portion 12 rigidly joined at its opposite ends to arms 8 and 10 at the rearward ends thereof. At their forward ends, arms 8 and 10 are connected to a transverse frame member 14 by means of elastically bushed pin joints 16 and 18 which form a common transverse pivot axis 19 defining the path of vertical deflection of member 6.

Secured to and extending oppositely outwardly from the rearward end of each of arms 8 and 10 are a pair of wheel spindles 20 and 22 upon which are rotatably supported ground engaging wheels 24 and 26. Inboard of each wheels 24 and 26, arms 8 and 10 are provided with support portions 28 and 30 which form the lower spring seats for coil springs 32 and 34. Vertically adjacent each portion 28 and 30, superstructure 4 is provided with an upper spring seat 36 and a corresponding spring seat (not shown) at the opposite side of the vehicle so that the superstructure 4 is resiliently supported relative to wheels 24 and 26 in the conventional manner.

According to the principal feature of the invention, the axle portion 12 of U-shaped member 6 is in the form of an inverted U-shaped channel 38 having parallel longitudinally spaced laterally extending flange portions 40 and 42. Because of the structural cross section provided by channel section 38 and flanges 40 and 42, axle 12 is essentially deflection free relative to bending, tension and compression loads and, therefore, functions in the normal manner when such loads are imposed thereon during vehicle operation. However, upon the occurrence of driving conditions wherein wheels 24 and 26 are required to deflect in opposite vertical directions (or where the sprung mass is subjected to forces inducing angular motion thereof about its roll axis), axle portion 12 responds in torsional deflection induced by opposite angular movement of the associated arms 8 and 10. As a result, a spring rate is produced by torsional deflection of axle 12 which augments the spring rate of the primary springs 32 and 34 and acts to resist vehicle roll motion. Naturally, under conditions of so-called parallel ride motion in which both wheels deflect the same amount in the same direction, the axle 12 functions in the normal manner and suspension of the superstructure is accomplished solely by the primary springs.

In order to impart lateral stability to the structure 6 without interfering with the roll resisting function thereof, according to another feature of the invention, a strut assembly 44 is disposed between the forward ends of arms 8 and 10 and a pivot assembly 46 mounted on axle 12 in alignment with the longitudinal centerline 48 of the vehicle. In the illustrated embodiment, assembly 44 is a one-piece rod having diagonally disposed opposite branches 50 and 52 which are rigidly connected at their forward ends to the forward ends of arms 8 and 10 by bolts 54 and 56. At their rearward juncture, branches 50 and 52 merge with a short transverse portion 58 having an aperture formed therein in which is disposed a resilient sleeve structure 60 surroundingly embracing pivot assembly 46. It will be seen that while strut assembly 44 imparts lateral rigidity to assembly 6, the pivotal connection 46 at the centerline prevents interference with opposite vertical angular movement of arms 8 and 10 and resultant torsional deflection of axle 12.

From the foregoing it will be seen that an improved, simplified and effective roll stabilizing wheel supporting structure has been provided. By utilizing the present invention, the need for a separate conventional torsional roll stabilizer is eliminated, while the advantages obtained thereby are totally retained. It is also to be particularly noted that the present construction achieves the desired roll stabilizing influence while maintaining stability of the planes of rotation of the road wheels 24 and 26. Thus, any tendency toward torsional or twisting deflection of arms 8 and 10 induced by vehicle cornering is resisted because of the rigid connection with axle portion 12 which in turn is structurally resistant to bending loads.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a vehicle, the combination of a sprung mass, a pair of laterally spaced trailing arms pivotally connected at their forward ends to said sprung mass on axes transverse to the vehicle roll axis, a pair of road wheels directly rotatably mounted on said trailing arms rearwardly of said axes, primary elastic means acting between each trailing arm and said sprung mass to resiliently support the latter, and means extending between and connected to the rearward ends of said arms acting to maintain said ends in laterally spaced relation, said means being torsionally deflectible responsive to opposite vertical deflection of said road wheels about said axes to produce a secondary elastic medium tending to resist angular movement of said sprung mass about said roll axis.

2. In a vehicle, the combination of a sprung mass, a pair of laterally spaced trailing arms pivotally connected at their forward ends to said sprung mass on axes transverse to the vehicle roll axis, a pair of road wheels directly rotatably mounted on said trailing arms near the rearward ends thereof, primary elastic means acting between each trailing arm and said sprung mass to resiliently support the latter, and means extending between and connected to the rearward ends of said arms acting to maintain said ends in laterally spaced relation, said means being torsionally deflectible responsive to opposite vertical deflection of said road wheels about said axes to produce a secondary elastic medium tending to resist angular movement of said sprung mass about said roll axis.

3. In a vehicle, the combination of a sprung mass, a pair of laterally spaced trailing arms pivotally connected at their forward ends to said sprung mass on a common axis transverse to the vehicle roll axis, a pair of road wheels directly rotatably mounted on said trailing arms rearwardly of said axis, primary elastic means acting to resiliently support said sprung mass relative to said wheels, and axle means extending transversely between and connected to the rearward ends of said arms acting to maintain said ends in laterally spaced relation, said axle means being torsionally deflectible responsive to opposite vertical deflection of said road wheels about said axis to produce a secondary elastic medium tending to resist angular movement of said sprung mass about said roll axis.

4. In a vehicle, the combination of a sprung mass, a pair of laterally spaced trailing arms pivotally connected at their forward ends to said sprung mass on a common axis transverse to the vehicle roll axis, a pair of road wheels directly rotatably mounted on said trailing arms rearwardly of said axis, primary elastic means acting to resiliently support said sprung mass relative to said wheels, axle means extending transversely between and connected to the rearward ends of said arms acting to maintain said ends in laterally spaced relation, said axle means being torsionally deflectible responsive to opposite vertical deflection of said road wheels about said axis to produce a secondary elastic medium tending to resist angular movement of the sprung mass about said roll axis, and a strut member arranged between said trailing arms rigidly connected to the forward ends thereof and pivotally connected to said axle means transversely midway thereof.

5. The structure set forth in claim 4 wherein said pivotal connection comprises a longitudinally extending trunnion on said axle means.

6. A unitary axle and control arm assembly for connecting road wheels to a vehicle superstructure comprising, a torsionally deflectible transverse axle portion which is essentially resistant to bending, compression and tension loading, a pair of spaced apart control arm portions each rigidly connected at one end thereof to one of the opposite ends of said axle portion, means at the opposite end of each arm portion for connecting said assembly to said superstructure for vertical swinging movement, and means directly rotatably supporting said road wheels on said assembly rearwardly of said axis of swinging movement thereof.

7. A unitary axle and control arm assembly for connecting road wheels to a vehicle superstructure comprising, a torsionally deflectible transverse axle portion which is essentially resistant to bending, compression and tension loading, a pair of spaced apart longitudinally extending control arm portions each rigidly connected at the rearward end thereof to one of the opposite ends of said axle portion, means at the forward end of each arm portion for pivotally connecting said assembly to said superstructure for vertical swinging movement about a transverse axis, and means directly rotatably supporting said road wheels on said assembly on a transverse axis substantially coincident with said transverse axle portion.

8. The structure set forth in claim 7 wherein said axle portion is a channel member of generally U-shaped cross section.

References Cited
UNITED STATES PATENTS 2,218,634  10/1940  Best _____ 267—20
2,713,498  7/1955  Brown _____ 280—104.5

FOREIGN PATENTS 1,360,385  3/1964  France.

BENJAMIN HERSH, *Primary Examiner.*

P. GOODMAN, *Assistant Examiner.*